UNITED STATES PATENT OFFICE.

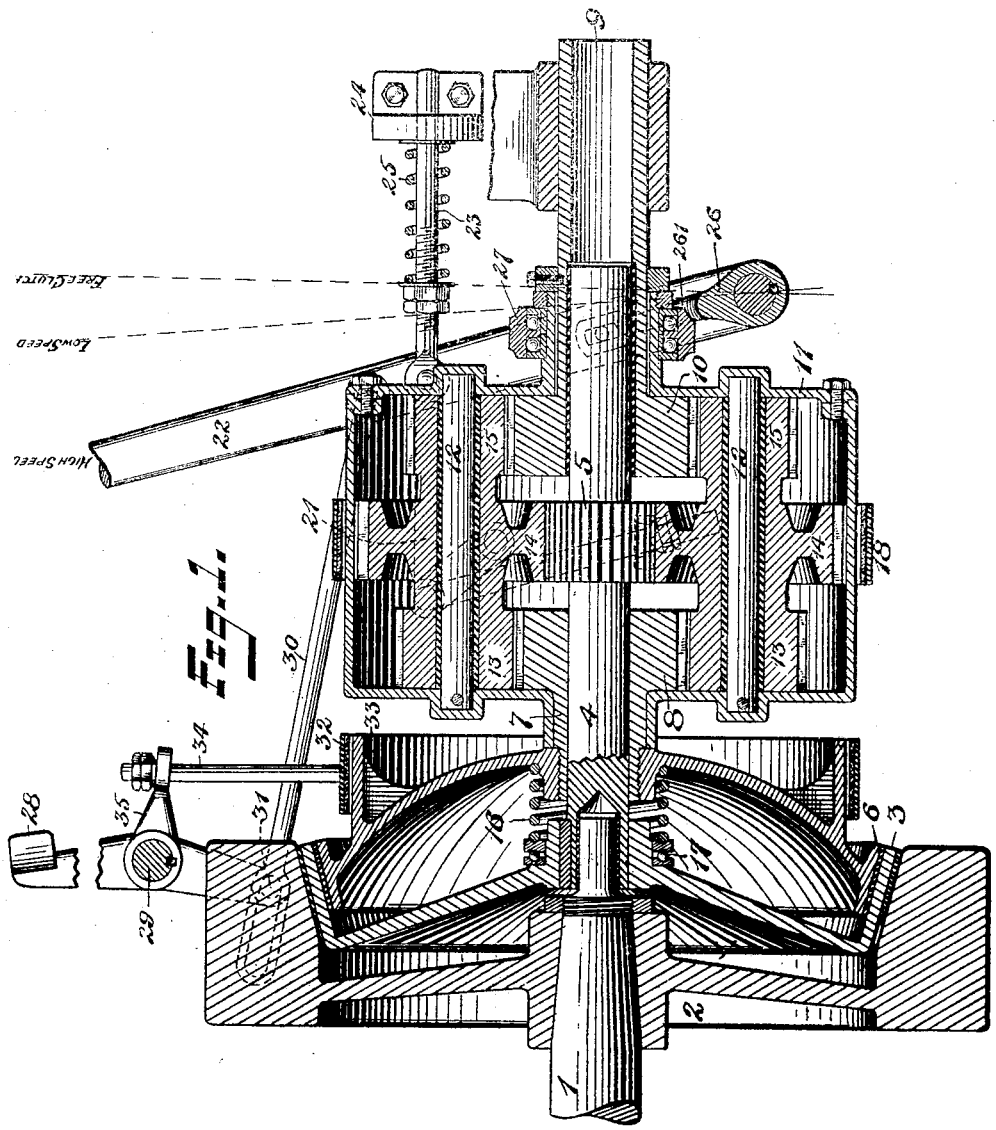

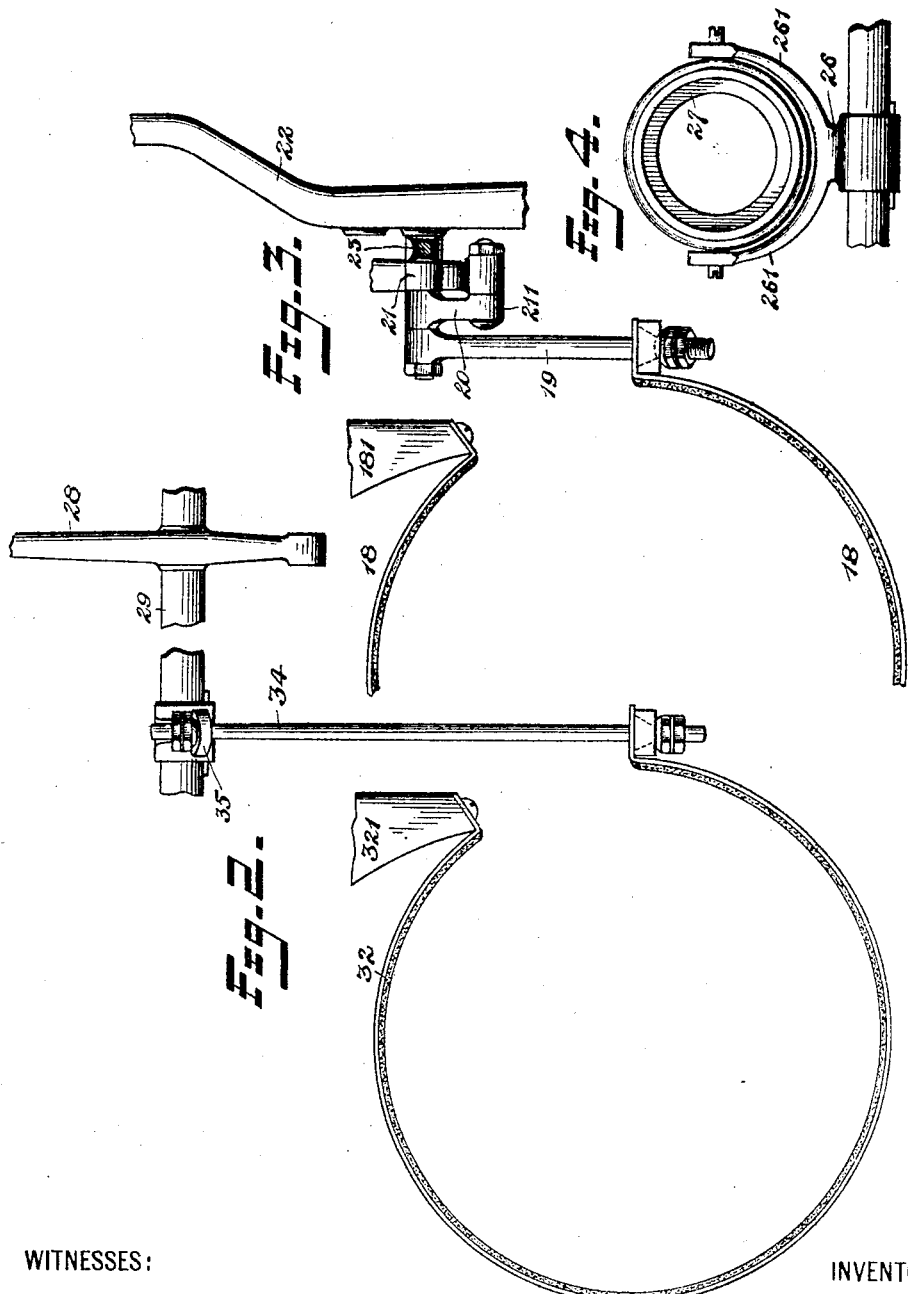

CARLTON R. RADCLIFFE, OF NEW YORK, N. Y.

POWER-TRANSMITTING APPARATUS.

No. 805,484. Specification of Letters Patent. Patented Nov. 28, 1905.

Application filed January 17, 1903. Renewed May 27, 1905. Serial No. 262,681.

*To all whom it may concern:*

Be it known that I, CARLTON R. RADCLIFFE, a citizen of the United States, residing at New York city, New York county, State of New York, have invented certain new and useful Improvements in Power-Transmitting Apparatus, of which the following is a full, clear, and exact description.

My invention relates to mechanism for transmitting power.

The purpose of my invention is to produce a transmission mechanism by which the speed of the driven part relatively to the driving part may be varied, reversed, or cut out at will.

The invention has particular utility in connection with automobiles driven by engines of the hydrocarbon type. Incidentally the construction is such that the apparatus may be thrown partially or wholly out of action at any time or the rotation of the driven part varied or reversed without unmeshing any of the gears, thus avoiding the danger of stripping the gear-teeth. The change in the transmitted speed may be effected by a single hand-operated lever. A pedal may be employed to coöperate with the hand-operated lever for the purpose hereinafter described. Beyond these two controlling devices—the lever and the pedal—nothing is needed to qualify the speed ahead or reverse or check the transmission of power. The construction also provides an automatic take-up to compensate for the wear of what is termed the "full-speed" clutch.

In the drawings, Figure 1 is a longitudinal sectional view of my transmission mechanism, certain parts being shown in elevation. Figs. 2, 3, and 4 are mainly elevations of certain details of construction.

1 is a driving member. 2 is a fly-wheel mounted thereon. The inner face of the flange of the fly-wheel is tapered to receive an annular tapered clutch 3. The hub of the clutch 3 is keyed to shaft 4.

5 is a gear fixed on shaft 4.

6 is a second tapered clutch having a tapered contact-face adapted to frictionally engage with the tapered inner wall of clutch 3. The clutch 3 may be engaged with or disengaged from the fly-wheel 2 by longitudinal movement. The clutch 6 may be engaged with or disengaged from the clutch 3 in a similar manner. Clutch 6 is fixed on sleeve 7, upon which is fixed gear 8.

9 is the driven member. The shaft 4 is intermediate of the driving member 1 and driven member 9, yet these parts may all be telescopic at their ends, so as to mutually aid in preserving alinement. The driven member 9 carries a gear 10.

11 is a gear-case rotatably mounted on sleeve 7 and member 9.

12 is a shaft carried by gear-case 11 and preferably secured against rotation in its bearings in said case.

13 14 15 are gears carried by shaft 12. These gears 13 14 15 may be made from a single piece of metal, as shown, or they may be separately formed and keyed to a common sleeve or hub. The gears 13 14 15 have a rotative movement around the axis of shaft 12 and a planetary movement around the axis of shaft 4. Gear 13 meshes with gear 8. Gear 14 meshes with gear 5. Gear 15 meshes with gear 10. Each of these sets of gears is of a different ratio from any other set for the purposes hereinafter described.

16 is a spring between clutches 3 and 6.

17 is an antifriction thrust-bearing which may be provided between one end of the spring 16 and the adjacent part. In the drawings the thrust-bearing 17 is shown between the hub of the clutch 3 and said spring. Hence when said clutches are not rotating simultaneously no substantial friction is set up at the end of the spring. The function of spring 16 is to keep the clutch 3 normally in engagement with the fly-wheel 2.

The parts thus far described will permit an understanding of the operation of the apparatus, which is substantially as follows: Assuming driving member 1 and its fly-wheel 2 are rotating at a given speed and clutch member 3 is in engagement with said fly-wheel, under such conditions the power of the driving member will be transmitted through clutch 3 and shaft 4 to gear 5. If the gear-case 12 is held stationary, this power will be transmitted through gears 5 14 and 15 10 to the driven member 9, which will thereupon be rotated at a speed (relatively to the driving member 1) depending upon the ratio of the aforesaid gears. In the particular form shown the speed of the driven member 9 will be less than the speed of the driving member 1. If the gear-case is released and allowed to rotate around the axes of shaft 4, it is obvious that the power of the driving member will cease to be transmitted to the driven member 9. By shifting the gear-case 11 longitudinally and in such a direction as to force the clutch 6 into engagement with clutch 3 the gear 8 will be caused to rotate at the same speed as shaft 4, since all of said gears will be practically locked together. Under this condition the full speed of the driving member will be transmitted to the driven member directly—that is, without passing through gears. To effect the reverse rotation of the driven member 9 relatively to the driving member 1, the clutch 6 is first freed from clutch 3 and is next held against rotation. When this is done, the gear 8 will be held stationary. Power will then be transmitted through the gear 5 to gears 13, 14, and 15 and a differential motion will be set up, due to the difference in the gear ratios, which differential motion will impart a reverse rotation in the driven member 9.

The means for operating the various parts may be arranged in several ways; but in the form shown they are as follows:

18 is a band-brake encircling gear-case 11, one end of which brake may be anchored at 181. This band-brake is operated by toggle-levers 19 20, the same being connected, as shown, to a controlling-lever 22 by means of a link 21. In the position shown in Fig. 1 the brake 18 is not being applied to the gear-case 11, but said gear-case is moved to the left, (as viewed in Fig. 1,) so that both clutches 3 and 6 are operatively connected with the fly-wheel 2. Means to hold said parts in this position comprises a lever 26, suitably connected with the aforesaid lever 22 in such manner as to be moved thereby. The lever 26 carries a yoke 261, engaging with an antifriction thrust-bearing 27, suitably mounted on the hub of the gear-case 11.

23 is a bar which may have a suitable mounting 24, in which it may slide, and a spring 25 may be provided to exert a force against the lever 22 to counter the force or tendency of the spring 16. Obviously if the spring 25 were not provided the tendency of the spring 16 would be to free the clutch 6 and to move the gear-case to the right. The presence of the spring 25, however, prevents this. Of course the ordinary notched segment, together with a hand-operated pawl of the ordinary form, (all of which are too well known to require illustration,) might be added to the lever 22 to hold it in any desired position, in which event the spring 25 would be uncalled for. As shown, it may be assumed the springs 16 25 are equivalent counter-forces, so that the lever 22 may be swung to any desired position and will there normally remain without the aid of any lock. When lever 22 is moved back or to the right, (as viewed in the drawings,) the gear-case 11 will be slid in a similar direction on shaft 4 and clutch 6 will be first freed from clutch 3. The spring 16, however, still serves to keep the clutch 3 in engagement with the fly-wheel 2. When the lever 22 has been moved far enough—say, to the "low-speed" position—the toggle-levers 19 20, pivoted at 211, act upon the brake 18 to clutch the drum 11, and thereupon the power will be transmitted to the driven member 9 at a reduced ratio, as before described. When the operating-lever 22 is moved still farther to the right, the first part of the movement pulls the toggle 20 past the center and releases brake 18, whereupon gear-case 11 is free to revolve. The end of gear 8 is then brought to bear against the end of gear 5, and the continued movement of the lever 22, gear-case 11, and gear 8 to the right forces the gear 5 and shaft 4 bodily to the right and to such an extent as to free the clutch 3 from the fly-wheel 2. In this position the transmission mechanism is entirely uncoupled from the driving source and the driven member 9 may come to rest.

28 is a lever in the form of a foot-pedal pivoted at 29 and connected to lever 22 through the medium of link 30. The pedal 28 has a pin 31, which engages with a slot in said link 30. The purpose of having said slot is to permit the operator to manipulate the lever 22 so that it will perform its functions independently of the foot-pedal 28. For example, as seen in Fig. 1, the lever 22 may partake of movement to the right without shifting the foot-pedal 28, the slot allowing of this independent movement. When, however, the foot-pedal 28 is pressed, it first moves the lever 22 to shift the gear-case 11 and clutch 6 to the right sufficiently to free the clutch 6 from clutch 3. It then applies brake 32 to the clutch 6 to lock it against rotation, whereupon the reverse movement of driven member 9 is effected, as previously described. Of course the operator may effect the operation of brake 32 and reverse the rotation of member 9 by moving lever 22 still farther to the right and beyond the "free-clutch" position. The brake 32 is a band-brake adapted to operate on the flange 33 on clutch 6. One end of the band-brake 32 is anchored at 321, while the other end is connected to a lever extension 35 on foot-pedal 28 through the medium of a link 34. It should be understood that the movement of the pedal 28 is only such as to uncouple the clutch 6 from the clutch 3 and apply the brake. It does not give enough movement to lever 22 to apply brake 18.

The principle of the invention herein set forth has been described in connection with such mechanism as will produce two changes in the forward speed. Obviously the principle is not confined to two speed changes.

It should be understood that I have shown and described only one specific form that my invention may take.

From the foregoing it will be seen that with a single lever the operator may obtain high speed, low speed, or entirely cut out or reverse the driven part. The wear on the clutches is automatically taken up throughout a large range. Manual adjustment may, however, be effected by shifting the position of the thrust-bearing 27 on the hub of the gear-case 11. This may be resorted to when new friction-faces are applied to the clutches should this ever be desirable. It will be observed that there is a clearance-space between the ends of gears 8, 13, and 5 and also between 10, 15, and 5. This clearance-space is permitted to allow of the shifting of the gear-case previously referred to.

It should be understood, of course, that I use the term "gear-case" conventionally and intend that it shall include any mechanism performing the function of a train-arm to carry the planetary-gear system. So, also, the other words employed to designate parts are used in a conventional sense and are intended to include equivalent devices or mechanisms in every instance.

It will be observed that in use the pedal 28 may be applied in such a way that if the driven part is being rotated forwardly it will first perform the function of a brake to check the forward rotation of the driven member and then cause the same to be rotated in a reverse direction. In this connection the construction possesses the advantage of eliminating the necessity of applying a separate brake preparatory to reversing the direction of rotation of the driven part. In this respect the apparatus is very useful on automobiles. While performing the function of a brake, the brake-band 32 will of course slip on and apply frictional resistance to the flange 33 of clutch 6, and through said clutch the same resistance will be transmitted back to the differential system and the driven part. There being but one hand-operated lever to consider and but one foot-pedal necessary, which performs the dual function of acting as a brake and operating the reverse mechanism, it is practically impossible for the operator to become confused in the event of an emergency. As is well known, where a multiplicity of levers is necessary to effect the changes such as obtained in the apparatus herein described it is not infrequent that the operator grasps the wrong lever and either works havoc to the apparatus itself or injury to himself. The danger of disaster from this cause is therefore practically eliminated.

Of course this apparatus does not contemplate the use of an ordinary brake aside from the one described.

What I claim is—

1. In an apparatus of the character described, a driving member and a driven member, intermediate mechanism comprising a shaft, a gear and a clutch supported thereby, the latter being adapted to be connected with or freed from the driving member, gears revolubly mounted on said shaft, a gear-case, gears of different ratios supported by said case, one of the same meshing with the gear on the aforesaid shaft, the others meshing with the gears revolubly mounted on said shaft, a clutch operatively connected with one of the latter gears, the other of said gears being connected with the driven member, and means for controlling certain members of the intermediate mechanism to produce changes in the speed of the driven part relatively to the driving part.

2. In an apparatus of the character described, a driving member, and a driven member, a gear carried by the driven member, a shaft in line with said driven member, a gear carried thereby, a clutch carried by said shaft to connect or disconnect the same with the driving member, the said clutch and shaft having longitudinal movement relatively to the driving member, a second clutch and a gear connected therewith said second clutch being adapted to connect said gear with said driving member, a planetary-gear system meshing with all of the aforesaid gears, and means to shift the planetary-gear system longitudinally relatively to said shaft and means to lock said second clutch, or said planetary-gear system against planetary movement, whereby the forward speed of the driven member may be qualified relatively to the rotation of the driving member and whereby the driving and driven members may be disconnected and whereby the direction of rotation of the driven member relatively to the driving member may be reversed.

3. In an apparatus of the character described, a driving member and a driven member, a planetary-gear system intermediate of said members said system including gears of different ratios, a gear-case supporting the same, an independent shaft, a gear carried thereby meshing with one of said planetary-gears, said shaft having longitudinal movement relatively to the driving member, a clutch connected to said shaft, a second clutch revoluble about the axis of said shaft and a gear carried by said clutch and meshing with the planetary system, and means to shift said planetary system to free the clutch or clutches, and means for controlling certain members of the intermediate mechanism to produce changes in the speed of the driven part relatively to the driving part.

4. In an apparatus of the character described, a driving member, a clutch coacting therewith, a shaft secured to said clutch, a gear secured to said shaft, a second clutch revolubly mounted on said shaft, a gear secured to said second clutch, said second clutch cooperating with the first-named clutch and the driving member, a driven member, a gear thereon, and a set of gears having planetary movement and in mesh with the aforesaid gears, all of said gears having different ratios, means for arresting and releasing the planetary movement of the planetary gears, and means for arresting or releasing the second clutch, and means for throwing the second clutch out of engagement with the first-named clutch and the first-named clutch out of engagement with the driving member, all arranged so that the forward speed of the driven member may be variably controlled or whereby the driven member may be disconnected from the driving member, or whereby the rotation of the driven member relatively to the driving member may be reversed.

5. In an apparatus of the character described, a driving member and a driven member, a planetary-gear system intermediate of said members, a shaft intermediate of said members and having rotative and longitudinal movement relative thereto, a clutch within the driving member and a second clutch within the first-mentioned clutch, said clutches being engaged with said shaft and with said planetary-gear system, respectively, and means to operate and control said parts to vary, cut out, or reverse the rotation of the driven member.

6. In an apparatus of the character described, a driving member, a driven member, an intermediate shaft and means for connecting or disconnecting the same with the driving member, a gear on said shaft, a planetary-gear system operatively connected with said gear, a clutch within the first-mentioned clutch, a gear carried thereby and meshing with said planetary-gear system, a gear on the driven member meshing with the planetary-gear system, means for locking or unlocking the first-mentioned clutch with the driving member, means for locking or unlocking the second-mentioned clutch with the driving member. means for locking the second-mentioned clutch against rotation, means for locking the planetary-gear system against planetary movement, the ratio of the gears being such that the speed of the driven member may be varied in a forwardly direction, or reversed.

7. In an apparatus of the character described, a driving member, a driven member, an intermediate shaft, a gear thereon, a clutch whereby said shaft may be engaged with or freed from the driving member, a second gear loosely mounted on said shaft, a clutch carried thereby whereby said gear may be connected to or disconnected from said driving member, planetary gears, a gear on said driven member meshing with the planetary gears, all of said gears being in mesh at all times, means for controlling the rotation of said parts independently, and means for shifting the planetary-gear system to control the operation of the clutches whereby the forward speed of the driven member may be qualified relatively to the driving member, or disconnected from said driving member, or reversed.

8. In an apparatus of the character described, a driving member and a driven member, an intermediate planetary-gear system constantly in mesh, the planetary gears being capable of longitudinal movement relatively to said driving and driven members and means operated thereby to impart variable speed in the driven member relatively to the driving member or disconnect the same or reverse the direction of rotation of the same, means for shifting said gears longitudinally, a single lever for controlling and varying the forward speed of the driven member or for disconnecting the same, a second lever coöperatively associated with the first lever whereby the transmission of power to the driven member to cause a forward rotation may be checked and whereby the parts may be controlled to set up differential action and a reverse rotation of the driven member.

9. In an apparatus of the character described, a driving member and a driven member, an intermediate planetary-gear system constantly in mesh, the planetary gears being capable of longitudinal movement relatively to said driving and driven members and means operated thereby to impart variable speed in the driven member relatively to the driving member or disconnect the same or reverse the direction of rotation of the same, means for shifting said gears longitudinally, a single lever for controlling and varying the forward speed of the driven member or for disconnecting the same, a second lever coöperatively associated with the first lever whereby the transmission of power to the driven member to cause a forward rotation may be checked and whereby the parts may be controlled to set up differential action and a reverse rotation of the driven member, the first-mentioned lever being capable of independently performing its functions, the second-mentioned lever being incapable of performing its functions independently of the first-mentioned lever.

10. In an apparatus of the character described, a driving member, a driven member, an intermediate shaft, a gear thereon, a second gear revolubly mounted on said shaft, and means for connecting and disconnecting said gear with said driving member, a gear on the driven part, all of said gears being of different ratios, a set of planetary gears revoluble around a common axis and in mesh with aforesaid gears at all times, and means for locking all of said gears against independent rotation, or for permitting the independent rotation of the said gears and arresting the planetary movement of the differential gears, or for imparting differential action in said gears to effect the reverse rotation of the driven part.

11. In an apparatus of the character described, a driving member, a driven member, an intermediate shaft, a gear thereon, a second gear revolubly mounted on said shaft, and means for connecting and disconnecting said gear with said driving member, a gear on the driven part, all of said gears being of different ratios, a set of planetary gears revoluble around a common axis and in mesh with aforesaid gears at all times, and means for locking all of said gears against independent rotation, or for permitting the independent rotation of the said gears and arresting the planetary movement of the axis of the differential gears, or for imparting differential action for said gears to effect the reverse rotation of the driven part, all of said gears, excepting the gear on the driven part, being longitudinally movable as well as rotatable.

12. In an apparatus of the character described, a driving member, a driven member, a shaft intermediate of said members, the ends of said parts being telescopic and in line, a gear on the intermediate shaft, a planetary-gear system including gears of varying sizes, said gears having a planetary movement around said intermediate shaft, a gear fixed on the driven part and in mesh with one of the planetary gears, a second gear revolubly mounted on said shaft and in mesh with still another of the planetary gears, a clutch for engaging or disengaging the intermediate shaft with the driving member, and another clutch for engaging or disengaging the said second gear with said driving member, and means for controlling certain members of the intermediate mechanism to produce changes in the speed of the driven part relatively to the driving part.

13. In an apparatus of the character described, a driving member, a driven member, a shaft intermediate of said members, the ends of said parts being telescopic and in line, a gear on the intermediate shaft, a planetary-gear system including gears of varying sizes, said gears having a planetary movement around said intermediate shaft, a gear on the driven part in mesh with one of the planetary gears, a second gear revolubly mounted on said shaft and in mesh with still another of the planetary gears, a clutch for engaging or disengaging the intermediate shaft with the driving member, and another clutch for engaging or disengaging said second gear with said driving member, means for locking said planetary gears against planetary movement when the first-mentioned clutch is in operative engagement with the driving member, means for locking said second gear against rotation when the first-mentioned locking mechanism is freed, means for simultaneously locking the intermediate shaft against independent rotation relatively to the driving member and simultaneously locking the gear rotatably mounted thereon, against rotation thereon.

14. In an apparatus of the character described, a driving member, a driven member, an intermediate shaft, a gear thereon, means whereby said shaft may be engaged with or freed from the driving member, a gear rotatably mounted on said shaft, means whereby the same may be connected with or disengaged from said driving member, a gear on the driven member and concentric with said shaft, all of said gears having clearance-space between them, the first two mentioned gears having longitudinal motion, planetary gears, means to carry said planetary gears, said planetary gears being in mesh with the aforesaid gears constantly, a brake for arresting the planetary movement of the planetary gears and for arresting the gear which is loosely mounted on the intermediate shaft, substantially as described.

15. In a power-transmission apparatus, a driving member, a driven member, an intermediate train of differential gears, a case supporting the same said case having longitudinal and rotative movement relatively to said driving and driven members, and means coöperating with said gear-case and operated by the movement of said case whereby the forward speed of the driven member may be modified, or the driven member disconnected from the driving member, or the rotation of the driven member reversed relatively to said driving member.

16. In an apparatus of the character described, a driving member, a driven member, an intermediate shaft, a train of differential gearing connecting the same and said intermediate shaft, a gear carried by said intermediate shaft, said shaft being located in line with the said driving member and driven member and supported thereby and having longitudinal movement independently thereof, means for producing said longitudinal movement, a pair of tapered annular friction-clutches coöperating one within the other, one of said clutches coöperating with the driving member, the differential-gear system being longitudinally movable to free one or both of said clutches.

17. In an apparatus of the character described, a driving member, a fly-wheel having an internally-tapered flange, a tapered clutch adapted to coact therewith, a shaft driven by said tapered clutch, a gear thereon, a second tapered clutch coacting with the first-named clutch and revolubly mounted on said shaft, a gear carried by said second clutch, a spring between said clutches, a driven member in line with said shaft, a gear carried by said driven member, all of said gears being of different ratios, a set of planetary gears having a common axis and meshing with the aforesaid gears, a gear-case supporting said planetary gears, means for shifting said gear-case to release one or both of said clutches, and means to arrest the rotation of the gear-case or the rotation of one of said clutches, neither of said arresting mechanisms being operated simultaneously.

18. In a power-transmission apparatus, a driving member, a driven member, an intermediate shaft, a gear supported thereon and driven thereby, a planetary-gear system driven by said gear, said gear and said planetary system being relatively movable longitudinally, a clearance-space being provided to permit of said relative longitudinal movement, means for effecting said longitudinal movement, and means to check at will the planetary movement of said planetary system.

Signed at New York, N. Y., this 3d day of January, 1903.

CARLTON R. RADCLIFFE.

Witnesses:
R. C. MITCHELL,
L. VREELAND.